(12) United States Patent
Matekunas et al.

(10) Patent No.: US 7,594,493 B2
(45) Date of Patent: Sep. 29, 2009

(54) METHOD FOR CONTROLLING FUEL INJECTION IN A COMPRESSION IGNITION ENGINE

(75) Inventors: Frederic Anton Matekunas, Troy, MI (US); Paul Anthony Battiston, Clinton Township, MI (US); Patrick G. Szymkowicz, Shelby Township, MI (US); Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 113 days.

(21) Appl. No.: 11/739,197

(22) Filed: Apr. 24, 2007

(65) Prior Publication Data

US 2007/0246004 A1 Oct. 25, 2007

Related U.S. Application Data

(60) Provisional application No. 60/794,411, filed on Apr. 24, 2006.

(51) Int. Cl.
F02B 3/00 (2006.01)
F02M 7/00 (2006.01)
G06F 17/00 (2006.01)
(52) U.S. Cl. .................. 123/299; 123/435; 701/104
(58) Field of Classification Search ............. 701/102, 701/103, 104, 105, 110, 114, 115; 123/299, 123/435, 478, 493; 73/114.16
See application file for complete search history.

(56) References Cited

U.S. PATENT DOCUMENTS

| 4,621,603 | A | 11/1986 | Matekunas |
| 4,622,939 | A | 11/1986 | Matekunas |
| 4,624,229 | A | 11/1986 | Matekunas |
| 4,940,033 | A | 7/1990 | Plee et al. |
| 5,038,737 | A | 8/1991 | Nishimaya et al. |
| 5,450,829 | A | 9/1995 | Beck |
| 6,376,927 | B1 | 4/2002 | Tamai et al. |
| 6,411,038 | B2 | 6/2002 | Murai et al. |
| 6,659,073 | B1 | 12/2003 | Franke et al. |
| 7,146,964 | B2 | 12/2006 | Norimoto et al. |
| 7,159,568 | B1 * | 1/2007 | Lewis et al. ............. 123/431 |
| 7,182,066 | B2 * | 2/2007 | Goya et al. ............. 123/435 |

(Continued)

FOREIGN PATENT DOCUMENTS

JP 2005-61239 A 3/2005

OTHER PUBLICATIONS

Sellnau,M;Cyl. Pressure-Based Engine Control using Pressure Ratio Management;SAE 2000-01-0932; 2000;Soc.Auto.Engrg; Warrendale, PA, USA.

*Primary Examiner*—Stephen K. Cronin
*Assistant Examiner*—Johnny H. Hoang

(57) ABSTRACT

A method for controlling operation of an internal combustion engine operating lean of stoichiometry is described. The engine is a multi-cylinder direct-injection engine operative in repetitive cycles each cycle including intake, compression, expansion, and exhaust strokes. The method includes adapting a plurality of fuel injectors to directly inject a first and a second mass of fuel into the cylinders during each cycle. Pressure sensing devices monitor in-cylinder pressure in the cylinders during ongoing operation. The first mass of fuel is injected into one of the cylinders. A cylinder pressure ratio is determined in the cylinder subsequent to injecting the first mass of fuel based upon the monitored pressure. The first mass of fuel injected is adjusted during a subsequent cycle based upon the cylinder pressure ratio.

15 Claims, 2 Drawing Sheets

U.S. PATENT DOCUMENTS

| | | | |
|---|---|---|---|
| 7,194,996 B2 * | 3/2007 | Koopmans | 123/295 |
| 7,207,315 B2 * | 4/2007 | Maruyama | 123/431 |
| 7,207,316 B2 * | 4/2007 | Moriya et al. | 123/435 |
| 7,210,456 B2 * | 5/2007 | Moriya et al. | 123/435 |
| 7,281,509 B2 * | 10/2007 | Fukui et al. | 123/179.16 |
| 7,347,185 B2 * | 3/2008 | Moriya et al. | 123/435 |
| 7,363,906 B2 * | 4/2008 | Ogawa et al. | 123/299 |
| 7,386,388 B2 * | 6/2008 | Akazaki et al. | 701/103 |
| 2005/0187700 A1 | 8/2005 | Jacobson | |
| 2005/0251322 A1 | 11/2005 | Wang et al. | |
| 2007/0250255 A1 | 10/2007 | Matekunas et al. | |

\* cited by examiner

US 7,594,493 B2

METHOD FOR CONTROLLING FUEL INJECTION IN A COMPRESSION IGNITION ENGINE

CROSS REFERENCE TO RELATED APPLICATIONS

This application claims priority from U.S. Provisional Application No. 60/794,411, filed Apr. 24, 2006, entitled ENGINE CONTROL.

TECHNICAL FIELD

This invention relates to operation and control of compression-ignition engines.

BACKGROUND OF THE INVENTION

The statements in this section merely provide background information related to the present disclosure and may not constitute prior art.

A variety of intrusive and non-intrusive pressure sensing means are known for sensing pressure within an internal combustion engine cylinder when the engine is motoring and during engine firing.

Various aspects of internal combustion engine controls are known which rely on in in-cylinder pressure measurements, particularly location of peak pressure (LPP), indicated mean effective pressure (IMEP) calibration and absolute peak pressure.

Diesel engine noise is known to be objectionable. It is also known that some relief is provided by pilot injection techniques. However, precise pilot injection remains challenging and known systems may exhibit unacceptable variability.

Known systems employ a noise-detecting procedure using signal information from block-mounted accelerometers to sense block vibration. The primary deficiencies of the existing systems relate to robustness and accuracy of the corrections.

It is known that multiple fuel injections per cylinder event are desirable in compression-ignition engines to alleviate undesirable combustion characteristics and attributes thereof, including e.g., noise. In such situation, the control system executes a pilot injection prior to a main fuel injection event to preheat the combustion chamber. In such systems, the pilot injection comprises a minimal amount of fuel, preferably injected at or near about top-dead-center (TDC) of piston travel, with the main fuel injection occurring after TDC, depending upon the engine load.

Reliably and accurately delivering pilot fuel is challenging for many fuel systems, and a method for detecting effects of the pilot injection and adjusting the injection during ongoing operation is desirable. Cylinder pressure transducers may enable fine tuning of the pilot injection. However, relatively high data sample rates are typically required.

Hence, a method is described herein which provides a high level of accuracy and alleviates issues related to use of calibrated pressure sensors. This makes it adaptable to methods for control systems with cylinder pressure sensors that are not calibrated.

SUMMARY OF THE INVENTION

In accordance with an embodiment of the invention, a method and system for controlling operation of an internal combustion engine operating lean of stoichiometry is provided. The engine includes a multi-cylinder direct-injection engine, the engine operative in repetitive cycles each cycle comprising intake, compression, expansion, and exhaust strokes. The method includes adapting a plurality of fuel injectors to directly inject a first and a second mass of fuel into the cylinders during each cycle. Pressure sensing devices monitor in-cylinder pressure in the cylinders during ongoing operation. The first mass of fuel is injected into one of the cylinders. A cylinder pressure ratio is determined in the cylinder subsequent to injecting the first mass of fuel based upon the monitored pressure. The first mass of fuel injected into the cylinder is adjusted during a subsequent cycle based upon the cylinder pressure ratio.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
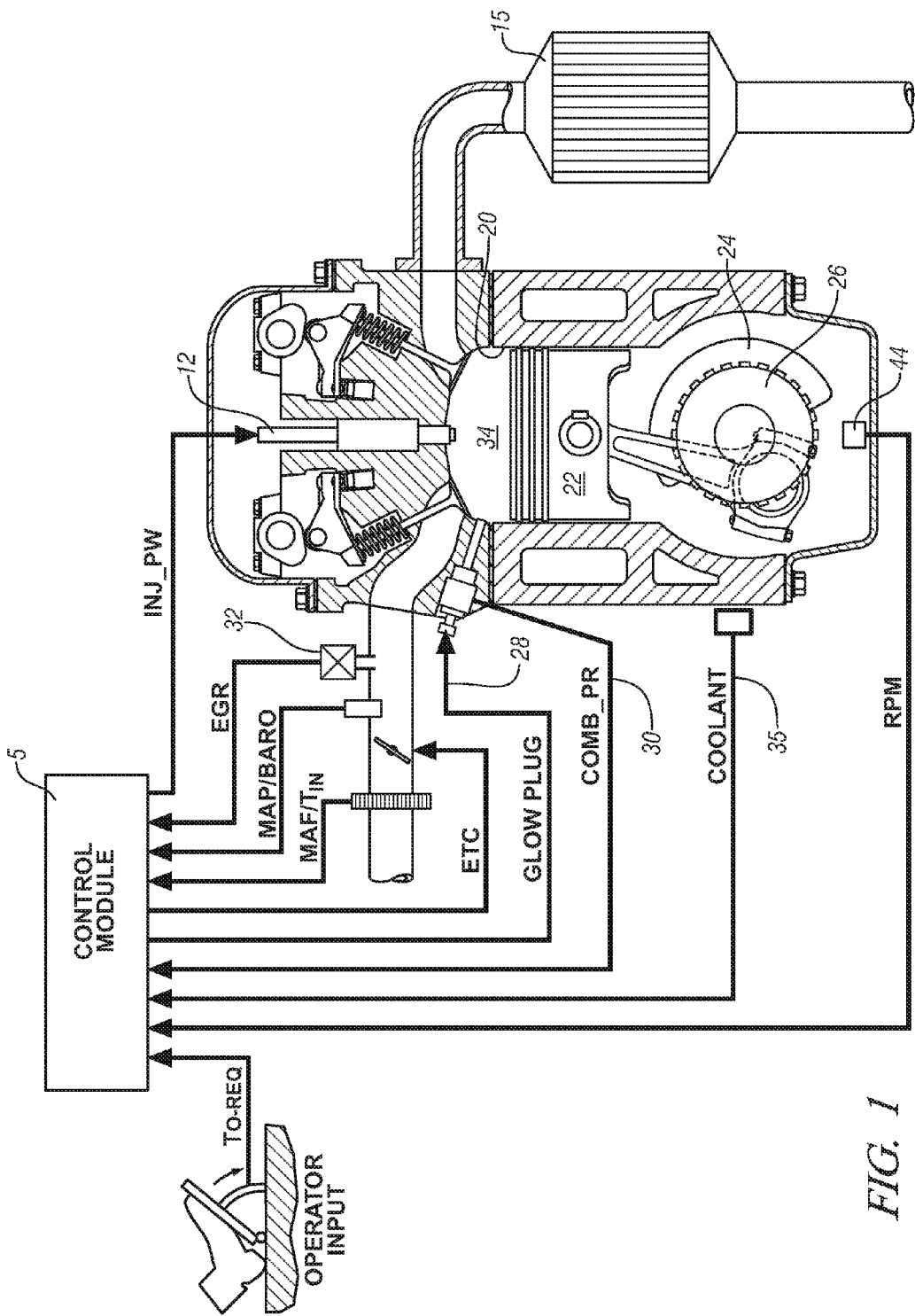
FIG. 1 is a schematic drawing of an engine, in accordance with the present invention; and, FIG. 2 is a data graph in accordance with the present invention.

Referring now to the drawings, wherein the depictions are for the purpose of illustrating the invention only and not for the purpose of limiting the same, FIG. 1 comprises a schematic diagram depicting an internal combustion engine, control module 5, and exhaust aftertreatment system 15, constructed in accordance with an embodiment of the present invention.

The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (To_req). The engine preferably employs a four-stroke operation wherein each engine combustion cycle comprises 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably has an air/fuel operating regime that is primarily lean of stoichiometry. The skilled practitioner understands that aspects of the invention are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The cylinder charge is subsequently combusted by action of compression thereof during the compression stroke.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (comb_pr). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, comb_pr, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature (Tin), and, a coolant sensor 35 (COOLANT). The system may include an exhaust gas sensor (not shown) for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, To_req, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (To_req). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 are supplied pressurized fuel from a fuel distribution system (not shown), and have operating characteristics including a minimum pulsewidth and an associated minimum controllable fuel flow rate, and a maximum fuel flowrate. The injector command signal encompasses a command for pilot injection, main injection, and any subsequent post injection, depending upon the specific operating system used. In the exemplary embodiment, each fuel injector injects a first, pilot mass of fuel at about 20 degrees bTDC, and a second, main mass of fuel at about 0 degrees bTDC during each cycle. The sum of the pilot mass and the main mass of fuel, and, possibility including a portion of any subsequent post injection, is sufficient to power the engine to meet the operator torque request.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event. Event-based algorithms and engine operation include pressure monitoring from the combustion sensor 30, wherein measurements are taken corresponding to each tooth passing on the crank wheel 26. Thus, when the crank wheel comprises a 60×-2× wheel, combustion sensing occurs each six degrees of crankshaft rotation, with one tooth and measurement corresponding to crank setting at 0 TDC for each piston.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, To_req, and from the sensors indicating the engine speed (RPM) and intake air temperature (Tin), and coolant temperature and other ambient conditions. The control module 5 determines instantaneous control settings for fuel injection mass and timing, EGR valve position, and, intake and exhaust valve phasing and lift set points from lookup tables in memory.

The invention described herein comprises a method for controlling operation of an internal combustion engine operating lean of stoichiometry, e.g., the engine described hereinabove with reference to FIG. 1. The fuel injectors directly inject a first, pilot mass of fuel and a second, main mass of fuel into each of the cylinders during each cycle. The pressure sensing devices monitor in-cylinder pressure in each cylinder during ongoing operation, preferably every three or six degrees of crank rotation in this embodiment. The first mass of fuel is injected into each of the cylinders, and a cylinder pressure ratio is determined for each cylinder immediately subsequent to injecting the first mass of fuel, preferably based upon the monitored pressure at a predetermined appropriate crank angle. The monitored pressure and the cylinder pressure ratio are preferably determined after an elapsed period of time sufficient to accommodate ignition delay of the injected first mass fuel. The second, main mass of fuel is injected into the cylinder in due course, according to predetermined calibrations. The first mass of fuel injected into the cylinder is adjusted to increase or decrease the first pilot mass of fuel injected during a subsequent cycle, based upon the determined cylinder pressure ratio. This is now described in detail.

Pressure ratios are determined during ongoing operation at each measurement of the cylinder pressure. A pressure ratio comprises a ratio of measured pressure when the engine is firing, compared to a pressure in the cylinder with the engine motoring, i.e., not fueled, at the specific crank angle. An exemplary method for determining a pressure ratio comprises using the first law of thermodynamics, written for a constant property mixture, as in Eq. 1, to calculate a pressure ratio at a crank angle, ca:

$$P(ca)/Pmot(ca)=1.0+mf*hc/(mtot*cv*Tint)\text{integral}[d(mbf-qwf)/d(ca)*(V(ca)/Vint)(\text{gamma}-1)]d(ca) \quad [1]$$

wherein:

mf is the mass of fuel burned;

hc is the heat of combustion;

mtot is the total mass;

cv is the specific heat at constant volume;

Tint is the initial charge temperature at start of compression;

d(mbf−qwf)/d(ca) is the net heat addition rate as a fraction of the total fuel energy;

gamma is the ratio of specific heats (cp/cv);

V(ca) is the cylinder volume as a function of crank angle;

Pmot is the adiabatic motored pressure determined using a polytropic process, and is computed during the cycle, or during a series of cycles; and, $$Pmot(ca)=Pint(Vint/V(ca))\text{gamma}.$$

Figure 2:
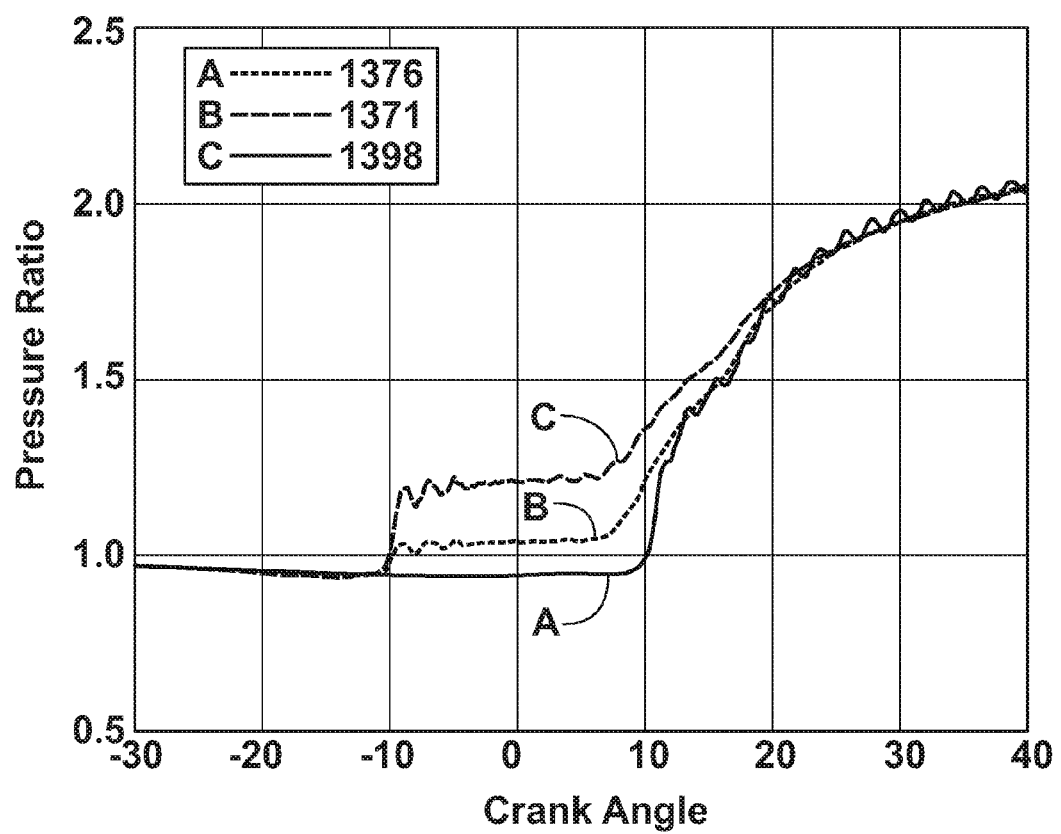

Referring now to FIG. 2, exemplary pressure ratio curves are depicted for a diesel engine operating in a conventional regime. For each of the curves A, B, and C, start of the main, i.e., second, injection occurs at a crank angle of 0 TDC, or right at top-dead center. For both curves B and C, which depict pilot injection and main injection, the start of injection of the first, i.e., pilot, injection occurs at 20 degrees bTDC. Without the pilot injection, the main injection produces a sudden pressure increase, as depicted by curve A. Addition of pilot amounts heats the charge into which the main is injected creating a smoother transition into the main burn as indicated by curves B and C, which coincide with increased mass of the first pilot fuel mass. There can be variability in accurately delivering a correct pilot mass of fuel, both with regard to metering and injection timing. Sources of variability include: fuel line pressure variations and oscillations; injector part-to-part variability and aging; fuel quality, and others.

For a system with a cylinder pressure signal available it is desirable to monitor the pressure-ratio to discriminate between the undesirably harsh events (e.g., curve A) and more desirable events (e.g., curve B). However, it is noted that a distinct high frequency or ringing signal content is observed at various portions of the different curves. These signals are generally within an acoustic range and may be referred to as acoustic signals. For example, the results depicted with reference to curve A exhibit a distinct ringing of substantial duration subsequent to the fuel injection event when no pilot injection is observed. In contradistinction, the results depicted in both curves B and C wherein varying pilot injections are observed, exhibit a distinct ringing substantially immediately after the pilot injection event. In both curves B and C it is further observed that the ringing is quickly attenuated and the duration is significantly more limited than that of the ringing related to curve A. Furthermore, as between curve B wherein there is a lesser amount of pilot fuel injection and curve C wherein there is a greater amount of pilot injection, curve B exhibits characteristically smaller amplitude ringing as compared to that of curve C.

Thus, during ongoing operation, the control system described herein ongoingly measures cylinder pressure and calculates pressure ratios at appropriate intervals, e.g., each three or six degrees of crank rotation. Within an allowable period of time subsequent to the pilot injection, primarily to accommodate ignition delay of the injected pilot fuel, and prior the main injection affecting the in-cylinder pressure, the pressure ratio is determined for each cylinder. In the results depicted with reference to FIG. 2, the first injection occurs at about 20 degrees bTDC and the main injection occurs at about 0 degrees TDC, with the ignition delay in the range of about ten degrees of crankshaft rotation for the first injection. Therefore, in-cylinder pressure is preferably measured between about ten degrees bTDC and about five degrees aTDC. When the pressure ratio for one of the cylinders is below a threshold, e.g., less than 1.15, the injector command, inj_pw, for the pilot injection is incremented for the subsequent engine cycle for the specific cylinder. During subsequent engine cycles, the injector command, inj_pw, is incremented, typically by increasing injector pulsewidth by a predetermined amount, until the pressure ratio for the cylinder exceeds a second threshold, e.g., greater than 1.30. The first and second thresholds are determined based upon pressure ratios which achieve the desired absence of ringing or acoustic noise, and related engine operating harshness. It is understood that with respect to the immediate description regarding pilot injection, a pressure signal may prove adequate and is preferable from the standpoint of reduced processor throughput requirements.

Alternatively, the raw pressure signals can be filtered using an analog signal, with the pressure signal being analyzed in a manner analogous to that executed with a knock sensor on a spark-ignition engine. The analog or digital band-pass or high-pass filtering may be employed to reject the lower frequencies of the pressure ratio or pressure signals and provide only a signal representative of the acoustic content. In one case wherein the signal region analyzed is subsequent to main injection, an absence or minimal ringing is indicative of a pilot injection event which successfully avoids the undesirably harsh combustion of, e.g., curve A. It follows then that a presence or threshold level of ringing subsequent to main injection is indicative of a pilot injection event or lack thereof which produces an undesirably harsh combustion of, e.g., curve A. In another case, wherein the signal region analyzed immediately after combustion of the pilot injection and corresponding to combustion of the main injection a high rate of change of the pressure ratio is indicative of a pilot injection event or lack thereof, which produces an undesirably harsh combustion of, e.g., curve A. It follows then that a presence of a sufficiently low enough rate of change in the pressure ratio is indicative of a pilot injection event which successfully avoids the undesirably harsh combustion of, e.g., curve A. The rates of change can be estimated with sampling of the pressure ratio at an appropriate expected region for the initiation of main injection heat release with sufficient sampling to resolve the slope of the pressure ratio curve. Optionally, a fixed crank angle sample in the vicinity of the expected main injection initial heat release can be recorded and compared to the value for a subsequent cycle with main injection timing shifted about a degree to shift the main heat release relative to the sample location thus providing effectively higher resolution sampling than might otherwise be practical Pilot amount could then be adjusted to based on limiting the measured rate of change.

The method is computationally simple and does not require calibrated sensors, as the pressure ratio calculation removes such need for linearity and eliminates a need for knowing the gain of the sensor output.

Generally the intent of the method is for onboard corrections for use with pressure-based feedback control systems. The established errors could be used to adjust metrics from sampled pressures and readjust the calibration as it might be affected by compression ratio and injection delivery timing readjustment. The method could be applied in situ, including determining motoring pressure by defueling individual cylinders or all cylinders at appropriate times and under the correct conditions such as during a deceleration. The motoring reference can be established for any condition which would be conveniently imposed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for controlling operation of a direct-injection multi-cylinder internal combustion engine operating lean of stoichiometry, the engine operative in repetitive cycles each cycle comprising intake, compression, expansion, and exhaust strokes, the method comprising:
   adapting fuel injectors to directly inject a first and a second mass of fuel into each cylinder during each cycle;
   adapting pressure sensing devices to monitor in-cylinder pressure during ongoing operation;
   injecting the first mass of fuel into one of the cylinders and determining the in-cylinder pressure immediately subsequent to injecting the first mass of fuel;
   determining the in-cylinder pressure an elapsed period of time after injecting the first mass of fuel to accommodate an ignition delay of the first mass of fuel and
   determining the in-cylinder pressure prior to ignition of the second mass of fuel injected into the cylinder.

2. The method of claim 1, further comprising adjusting the first mass of fuel injected into the cylinder based upon the in-cylinder pressure determined immediately subsequent to injecting the first mass of fuel into the cylinder.

3. The method of claim 2, wherein adjusting the first mass of fuel injected into the one cylinder comprises increasing the first mass of fuel when the in-cylinder pressure determined immediately subsequent to injecting the first mass of fuel is below a predetermined threshold.

4. The method of claim 3, further comprising adjusting the first mass of fuel injected into the cylinder during a subsequent cycle.

5. The method of claim 2, wherein adjusting the first mass of fuel injected into the cylinder comprises decreasing the first mass of fuel when the determined in-cylinder pressure is greater a predetermined threshold.

6. Method for controlling operation of a direct-injection multi-cylinder internal combustion engine operating lean of stoichiometry, the engine operative in repetitive cycles each cycle comprising intake, compression, expansion, and exhaust strokes, the method comprising:
   adapting fuel injectors to directly inject a first and a second mass of fuel into each cylinder during each cycle;
   adapting pressure sensing devices to monitor in-cylinder pressure during ongoing operation;
   injecting the first mass of fuel into one of the cylinders and determining the in-cylinder pressure immediately subsequent to injecting the first mass of fuel;
   determining a pressure ratio for each cylinder based upon the in-cylinder pressure determined immediately subsequent to injecting the first mass of fuel; and,
   adjusting the first mass of fuel injected into the cylinder based upon the cylinder pressure ratio for the cylinder.

7. The method of claim 6, wherein determining the pressure ratio for each cylinder immediately subsequent to injecting the first mass of fuel comprises determining a ratio between the monitored pressure and a corresponding motoring pressure at an engine position determined by a crankshaft position.

8. Method for controlling operation of a multi-cylinder direct-injection internal combustion engine operating lean of stoichiometry and operative in repetitive cycles each cycle comprising intake, compression, expansion, and exhaust strokes, the method comprising:
   adapting fuel injectors to directly inject a first and a second mass of fuel into each cylinder during each cycle;
   adapting pressure sensing devices to monitor in-cylinder pressure during ongoing operation;
   injecting the first mass of fuel into one of the cylinders and determining the in-cylinder pressure immediately subsequent to injecting the first mass of fuel; and
   adjusting the first mass of fuel based upon the determined in-cylinder pressure;
   wherein adapting a plurality of pressure sensing devices to monitor in-cylinder pressure in the cylinders during ongoing operation comprises inserting pressure sensing devices onto glow plug bosses on a cylinder head.

9. The method of claim 8, further comprising an engine and control module operative to execute the method.

10. Method for controlling acoustic noise in a multi-cylinder direct-injection internal combustion engine operating lean of stoichiometry, the engine operative in repetitive cycles each cycle comprising intake, compression, expansion, and exhaust strokes, the method comprising:
   adapting fuel injectors to directly inject a first and a second mass of fuel into each of the cylinders during each cycle;
   adapting pressure sensing devices to monitor in-cylinder pressures during ongoing operation;
   injecting the first mass of fuel into one of the cylinders;
   monitoring the in-cylinder pressure and a corresponding engine crank position subsequent to injecting the first mass of fuel;
   adjusting the first mass of fuel based upon the monitored in-cylinder pressure;
   determining a cylinder pressure ratio immediately subsequent to injecting the first mass of fuel based upon the monitored in-cylinder pressure; and
   increasing the first mass of fuel injected into the cylinder during a subsequent cycle when the cylinder pressure ratio is less than a predetermined threshold.

11. The method of claim 10, further comprising decreasing the first mass of fuel injected into the cylinder during a subsequent cycle when the cylinder pressure ratio is greater a predetermined threshold.

12. The method of claim 10, further comprising monitoring the cylinder pressure an elapsed period of time after the first injection based upon an ignition delay of the first mass of fuel.

13. The method of claim 12, further comprising monitoring the in-cylinder pressure prior to ignition of the second mass of fuel injected into the cylinder.

14. The method of claim 10, wherein monitoring the in-cylinder pressure subsequent to injecting the first mass of fuel further comprises:
   injecting the second mass of fuel into the one of the cylinders;
   monitoring the cylinder pressure; and,
   determining a rate of change in the cylinder pressure ratio subsequent to injecting the second mass of fuel.

15. Method for operating a multi-cylinder direct-injection engine, the engine operative in repetitive cycles each cycle comprising intake, compression, expansion, and exhaust strokes and adapted to execute multiple fuel injection events each cycle, the method comprising:
   operating the engine lean of stoichiometry;
   adapting fuel injectors to execute a pilot fuel injection event and a main fuel injection event to inject fuel into each cylinder during each cycle;
   adapting non-calibrated pressure sensing devices to monitor in-cylinder pressure in each of the cylinders during ongoing operation;
   injecting the pilot fuel and the main fuel into one of the cylinders;
   determining cylinder pressure ratio based upon the monitored in-cylinder pressure;
   determining a rate of change in the cylinder pressure ratio subsequent to injecting the main fuel; and
   adjusting the pilot fuel injected into the cylinder during a subsequent cycle based upon the rate of change in the cylinder pressure ratio.

* * * * *